(12) United States Patent
Le Garrec et al.

(10) Patent No.: US 8,608,082 B2
(45) Date of Patent: Dec. 17, 2013

(54) MICROCIRCUIT DEVICE INCLUDING MEANS FOR AMPLIFYING THE GAIN OF AN ANTENNA

(75) Inventors: Loïc Le Garrec, Chateaubourg (FR); Agnès Duval, Balaze (FR); François Launay, Vitre (FR)

(73) Assignee: Oberthur Technologies, Lavallois Perret (FR)

( * ) Notice: Subject to any disclaimer, the term of this patent is extended or adjusted under 35 U.S.C. 154(b) by 136 days.

(21) Appl. No.: 13/186,344

(22) Filed: Jul. 19, 2011

(65) Prior Publication Data

US 2012/0018522 A1 Jan. 26, 2012

(30) Foreign Application Priority Data

Jul. 20, 2010 (FR) ...................................... 10 55886

(51) Int. Cl.
*G06K 19/06* (2006.01)
(52) U.S. Cl.
USPC .......................................... 235/492; 235/487
(58) Field of Classification Search
USPC .............. 23/492, 487; 235/492, 487
See application file for complete search history.

(56) References Cited

U.S. PATENT DOCUMENTS

| 5,955,723 | A | 9/1999 | Reiner |
| 6,774,865 | B1 | 8/2004 | Serra |
| 8,141,787 | B2 * | 3/2012 | Savry ............................ 235/492 |
| 8,378,911 | B2 * | 2/2013 | Eray et al. ..................... 343/788 |
| 2004/0046663 | A1 | 3/2004 | Jesser |

FOREIGN PATENT DOCUMENTS

EP 1 031 939 8/2000

* cited by examiner

*Primary Examiner* — Daniel St Cyr
(74) *Attorney, Agent, or Firm* — Cozen O'Connor (57) ABSTRACT

The electronic device (10) comprising a microcircuit (18) module (20), a near-field communication antenna (36) electrically connected to the microcircuit (18) of the module (20), delimiting an antenna surface (S), and a body (12) incorporating the module (20). More precisely, the antenna (36) is arranged within the module (20) and the body (12) incorporates means (40) of amplifying the gain of the antenna (36) comprising an electrically conductive element (42) electrically isolated from the microcircuit (18) and the antenna (36), of an annular general shape arranged around an area (R) of the body (12) forming a volume generated by the projection of the antenna surface (S) along a direction (Z) substantially orthogonal to the surface (S).

21 Claims, 5 Drawing Sheets

MICROCIRCUIT DEVICE INCLUDING MEANS FOR AMPLIFYING THE GAIN OF AN ANTENNA

RELATED APPLICATIONS

This application claims the priority of French application no. 10/55886 filed Jul. 20, 2010, the entire content of which is hereby incorporated by reference.

FIELD OF THE INVENTION

The present invention relates to the technical field of portable electronic devices of the contactless type comprising a near-field communication antenna connected to a microcircuit, allowing contactless communication to be established with an external device.

The invention applies more particularly but not exclusively to chip cards equipped with an antenna, such as the so-called contactless cards allowing contactless communication to be established at a predefined operating frequency, for example 13.56 MHz defined by the ISO 14443 standard, or the so-called hybrid or dual cards allowing both the establishment of contactless communication and communication with contact through an external contact interface capable of making contact with a matching reader.

The invention also applies to any type of portable or pocket-sized electronic device incorporating such an antenna, such as a USB key, an RFID (Radio Frequency IDentification) tag, a passport, etc.

BACKGROUND OF THE INVENTION

The near-field communication antenna is generally made up of an electrically conducting wire wound in a plurality of electrically conductive coils, incorporated into the periphery of the card body in order to optimize the dimensions of the antenna and thus the range of the electronic device.

An electronic device such as a dual type chip card comprising an antenna connected to a microcircuit is already known in the state of the art, particularly from document WO 2008/129526. The card comprises a body provided with a cavity for receiving a module bearing the microcircuit. The body also incorporates the antenna which is connected to the microcircuit through two metal lands carried on the substrate.

Such a connection has the disadvantage of being relatively complex to make, particularly due to the fact of the presence of the junction between the antenna and the microcircuit. The manufacture of this junction requires the use of specific equipment which is relatively costly.

In addition, the junction obtained is more or less reliable, particularly because it can be weakened during bending or torsion of the card body which can lead to bad contacts and short-circuits between the internal circuits of the microcircuit and the antenna.

SUMMARY OF THE INVENTION

One object of the invention is to provide a contactless card comprising a near-field communication antenna allowing a reliable connection of the antenna and the microcircuit while being simple to make.

To this end, one aspect of the invention is directed to an electronic device comprising a microcircuit module, a near-field communication antenna electrically connected to the module's microcircuit delimiting an antenna surface, and a body incorporating the module. The antenna is arranged on a substrate of the module and the body incorporates means of amplifying the gain of the antenna comprising an electrically conductive element, electrically isolated from the microcircuit and from the antenna, of generally annular shape, arranged around an area of the body constituting a volume generated by the projection of the antenna surface along a direction substantially orthogonal to the surface.

The arrangement of the antenna within the module makes it possible to facilitate the manufacture of the junction between the microcircuit and the antenna. Such an arrangement of the antenna also makes it possible to dispense with the conventional drawbacks connected with positioning of this antenna within the body of the device. Thanks to the invention, various printing, embossing and magnetic striping operations are independent of the position of the antenna in the device, which has many advantages, particularly in the case of special applications such as in the field of chip cards.

To maintain satisfactory performance of the antenna despite a reduction in its dimensions due to incorporation in the module, one embodiment of the invention includes an antenna gain amplification element to the body. The addition of such an electrically conductive element significantly increases the performance of the antenna by channeling the lines of the magnetic field emitted by an external terminal into the antenna surface.

Indeed, the element constitutes an antenna gain amplifier improving the level of the current induced in the latter as well as the level of back-modulation of the antenna when the device is placed in the magnetic field of the external terminal.

Further, the positioning within the body of this element does not have the aforementioned drawbacks relating to the arrangement of the antenna within the body.

In conformity with an embodiment of the invention, the element extends around the antenna outside of an area defined by the projection of the antenna along a direction substantially orthogonal to the antenna surface. Thus, the antenna and the ring must not extend facing one another so as not to mask the magnetic field flux through the antenna surface.

In other words, the element extends outside the outer perimeter of the antenna in a plane parallel to that containing the antenna or part of the antenna, or possibly in the same plane. However, when the element extends within the same plane as the antenna or part of the antenna, a minimum spacing is provided between the element and the antenna to ensure electrical isolation.

In a preferred embodiment, the element delimits an internal peripheral edge surrounding the area at a minimum distance, for example less than or equal to five millimeters. It has in fact been discovered that the smaller the distance separating the element from the antenna, the better the performance. Thus, the distance can be substantially nil in the case where the antenna and the element are in separate planes.

Preferably, the distance is minimized to within the limit of a positioning tolerance of the antenna within the module.

In a preferred embodiment, the antenna consisting of a winding of electrically conductive coils, the positioning tolerance of the antenna within the module corresponds substantially to one interval between coils. Generally, the space between two coils is limited by the accuracy of manufacture of the antenna, for example the accuracy of the etching that allows the two coils to be insulated from each other.

Preferably, the module including a substrate bearing the microcircuit and the antenna, the positioning tolerance of the antenna within the module corresponds substantially to the positioning tolerance of the antenna on the substrate.

A device according to an embodiment of the invention may also include one or more of the following features:

the antenna extending along the periphery of at least one of the faces of the substrate or of the two opposite faces of the module substrate;

the element extending in a plane containing the antenna or at least part of the antenna;

the body being provided with a cavity for receiving the module, the element delimiting an inner peripheral edge surrounding the module which is at least partly flush with the surface of a peripheral wall of the cavity;

the cavity including a deep central area for receiving the microcircuit and a peripheral area, raised with respect to the central area, supporting a module substrate, the element surrounds the peripheral area;

the element forming a ring that is closed, or broken at least once;

the device is a chip card of the contactless type or of the dual type;

the element is made of a metallic material with magnetic permeability less than or equal to one;

the metallic material is an electrically conductive ink.

Another aspect of the invention is directed to a manufacturing method for a device according to the invention, comprising a body forming step and a step for forming the cavity within the body. During the body forming step, an electrically conductive layer is arranged in the body such that, during the cavity forming step, the cavity passes through the electrically conductive layer to form the ring.

A method according to an embodiment of the invention can also comprise one or another of the features wherein:

the layer extends transversely over the entire surface of the body;

the body consisting of a multilayer structure, the electrically conductive layer is interleaved between two layers of the body;

the electrically conductive layer is printed on one of the layers of the body with an electrically conductive ink, for example by silkscreen printing on one of the layers of the body.

BRIEF DESCRIPTION OF THE DRAWINGS

Other features and advantages of the invention will appear in the light of the description that follows, made with reference to the appended drawings wherein.

DETAILED DESCRIPTION OF THE DRAWINGS

Figure 1:
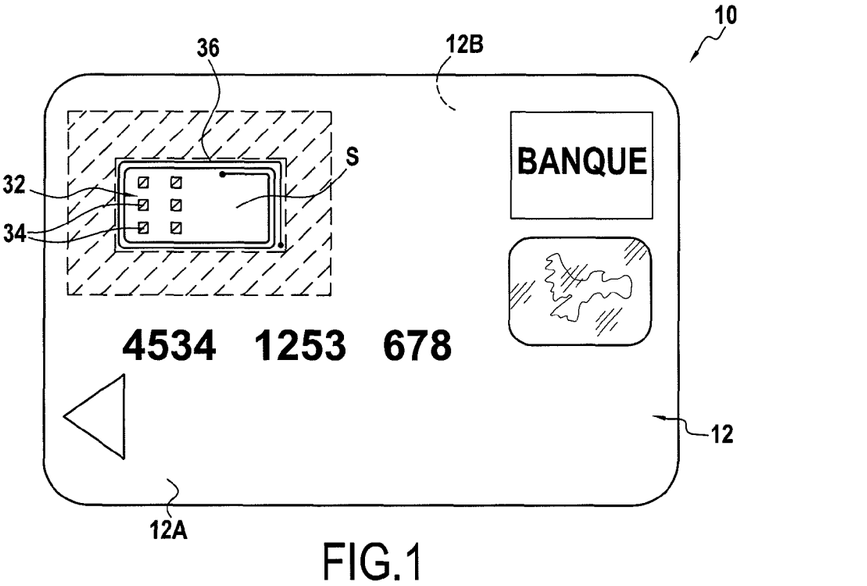
FIG. 1 shows an electronic device, such as a card, according to a first embodiment of the invention.

A microcircuit device according to the invention is shown in FIG. 1. This device is designated with the general reference number 10.

In the example described, the microcircuit device 10 is a chip card. As a variation, the device 10 can be a page of a passport such as the cover of the passport or a self-adhesive tag such as a "sticker."

As shown in FIG. 1, the device 10 comprises a body 12 in the general shape of a card delimiting the first 12A and second 12B opposite faces.

In this embodiment, the body 12 delimits the outside dimensions of the card 10. In this example and by preference, the dimensions of the card are defined by the ID-1 format of the ISO 7816 standard which is the format conventionally used for bank cards with dimensions of 86 mm by 54 mm and with a thickness substantially equal to eight hundred micrometers. Of course, other card formats can also be used.

Preferably, the card body 12 is formed by lamination, that is by formation, for example by means of a press and in a hot laminating operation, of a stack of laminated layers of sheets made for example of thermoplastic material.

Preferably, the body 12 comprises a stack of at least three layers: a central layer 14 forming a data printing layer interleaved between two external transparent layers 16A, 16B. In the embodiment illustrated in FIG. 2, the central layer 14 for data printing is itself made up of three sublayers, a central sublayer 14C forming an "inlay," interleaved between two other sublayers for data printing 14A, 14B. The two outside layers 16A, 16B are called "overlay," and have the function for example of protecting the data printed on the central layer 14C. For example, the body has a thickness of eight hundred micrometers and the outside layers 16A, 16B have a thickness substantially comprised between forty and eighty micrometers. The sublayers 14A, 14B, 14C have thicknesses comprised between 200 and 300 micrometers.

Figure 8:
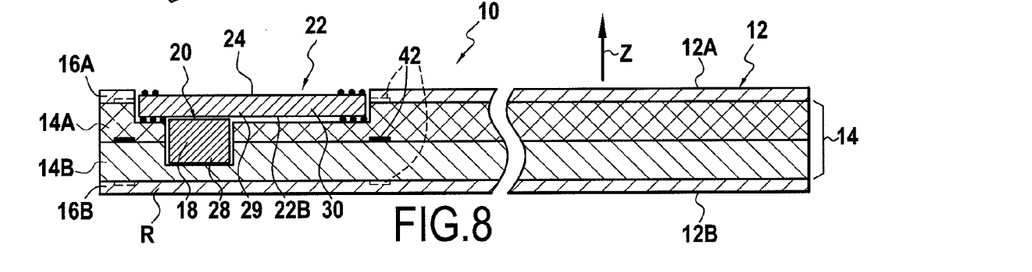
FIG. 8 shows a first variation of the device of FIGS. 1 and 2.

In the variation illustrated by FIG. 8, the body 12 can include a central layer 14 comprising two sublayers 14A and 14B, the two layers together being interleaved between two transparent layers 16A, 16B. More generally, the central layer 14 can comprise one sublayer or more than two sublayers.

For example, the layers 14, 16 are made of a material consisting essentially of a plastic such as polycarbonate, PVC, etc.

As a variation, the body 12 can be formed by casting, for example from plastic.

In conventional fashion, the device comprises a microcircuit 18 capable of exchanging data with an external terminal, of processing and/or storing data in memory. In conformity with the invention, the body 12 incorporates a microcircuit module 20 comprising the microcircuit 18.

Figure 2:
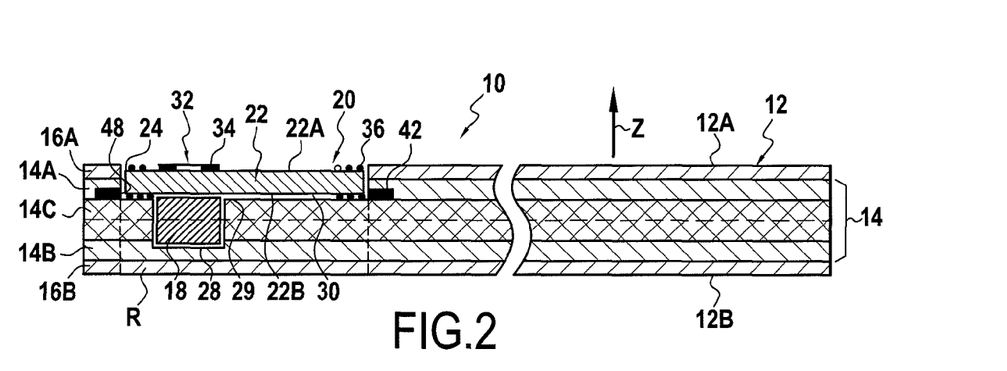
FIG. 2 shows a section view of the card of FIG. 1.

In the example described, the module 20 includes a substrate 22 bearing the microcircuit 18. Thus, as illustrated in FIG. 2, the substrate 22 delimits the first 22A and second 22B opposite faces, called respectively the outer face and the inner face, the outer face 22A being oriented toward the outside of the card 10. The substrate 22 is, for example, made of epoxy type glass fiber, of polyester or of paper and has a thickness comprised for example between fifty and two hundred micrometers. Preferably, the substrate 22 is made of plastic based essentially on polyimide with a thickness of about seventy micrometers.

In addition, in this example, as illustrated by FIG. 2, the body 12 includes a cavity 24 for housing the module 20. This cavity 24 is preferably formed within the body 12 and opens onto one of the faces 12A, 12B of the body 12, for example the first face 12A.

In a variation not illustrated in the figures, the module 20 can be incorporated into the body 12, for example to constitute a contactless type device. In this case, the module 20 can be made invisible from the outside by opacification, for example with opaque ink, of the layers surrounding it.

Figures 5, 7:
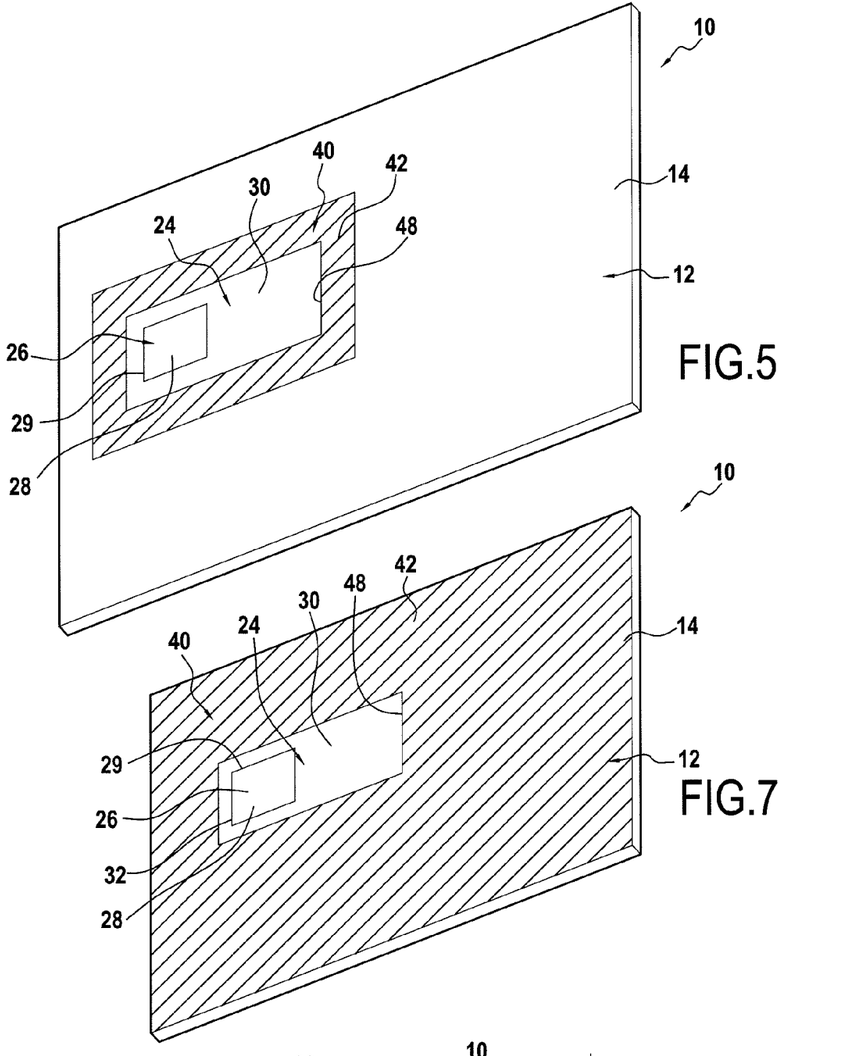
FIG. 5 shows a step in the manufacturing method of the device of FIGS. 1 through 4.
FIG. 7 shows a step in the manufacturing method of the device of FIG. 6.

As illustrated in FIG. 5, the cavity comprises for example a deep central area 26 provided with a bottom 28 for housing the microcircuit 18 and a peripheral area 30 raised with respect to the central area 26 delimiting a step 29 with the bottom 28. This peripheral area 30 comprises a supporting surface raised with respect to the bottom of the cavity 24 on which rest the edges of the substrate 22 of the module 20 (FIG. 2).

Such a cavity 24 is generally obtained by machining, typically by milling or spot facing, in two operations:
- a large spot facing to form the peripheral area 30 corresponding to the depth of the step,
- a small spot facing to form the deeper central area 26.

In order to communicate with an external terminal, the card 10 comprises for example an external interface 32 of contact pads 34 electrically connected to the microcircuit 18. This interface 32 allows communication to be established by contact between the card 10 and another external terminal, for example when the card 10 is inserted into a matching card reader.

In the example described, the interface 32 comprises a series of metal electrical contact pads 34, complying with a predefined chip card standard. For example, the contact pads comply with the ISO7816 standard. In this embodiment, the contacts 34 of the interface 32 correspond to the contacts C1, C2, C3, C5, C6, C7 of the ISO7816 standard.

The interface 32 of the card 10 is preferably made of a layer of metallic material such as copper but may also be made, as a variation, by silkscreen printing of conductive ink of the epoxy ink filled with particles of silver or gold type or by silkscreen printing of an electrically conductive polymer. Conventionally, the pads are electrically connected to the microcircuit 18 by electrically conductive wires such as for example gold wires running through vias provided in the module substrate, connected in their turn to electrically conductive connecting traces extending over the inner face of the substrate.

In this embodiment, the card 10 is of the dual type, that is it includes both a contactless interface capable of establishing near-field communication with an external terminal and an interface with contact capable of establishing communication with another external terminal by contact. However, in a variation not illustrated, the card can be solely of the contactless type. In that case, the card 10 is preferably not equipped with the interface 32 having external contacts 34.

To this end, for establishing contactless communication with an external terminal, such as an external reader, the device 10 still comprises a near-field communication antenna 36 electrically connected to the microcircuit 18. The antenna 36 has an outside perimeter delimiting an antenna surface S.

In conformity with the invention, the antenna 36 is arranged within the module 20.

Preferably, the antenna 36 consists of a winding of electrically conductive coils. For example, the antenna 36 consists of a copper trace. The antenna 36 preferably comprises a plurality of coils each with a width on the order of fifty to three hundred microns and the spacing between two contiguous coils is on the order of fifty to two hundred micrometers. The minimum spacing between two coils of the antenna 36 will be denoted coil interval.

Preferably, the antenna 36 extends over the substrate 22 and consists of a winding of electrically conductive coils extending along the periphery of one of the faces of the substrate 22, for example the inner face 22B.

The antenna 36 is for example made by depositing a metal, using an etching or a silk-screening technology. Possibly, as a variation, the antenna 36 can also consist of an electrically conductive wire in an insulating sleeve.

Figure 3:
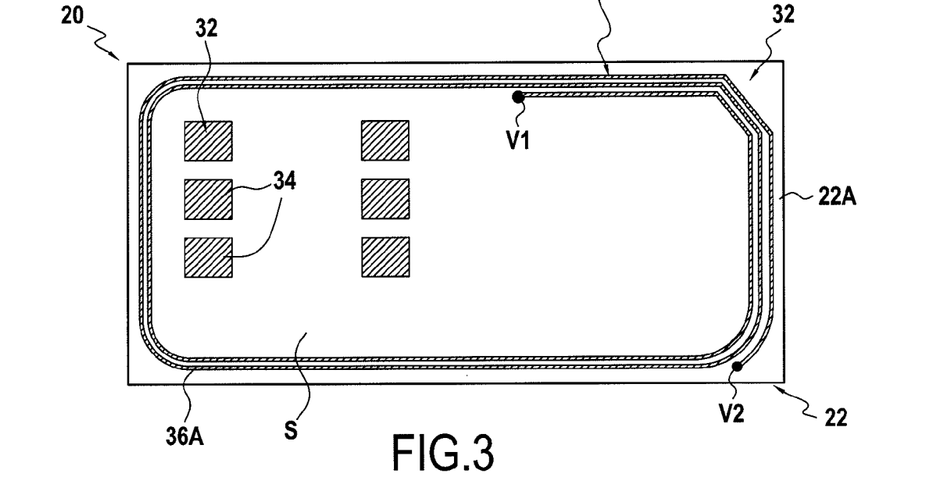
FIGS. 3 and 4 show top and bottom views, respectively, of an electronic module of the device of FIGS. 1 and 2.
Figure 4:
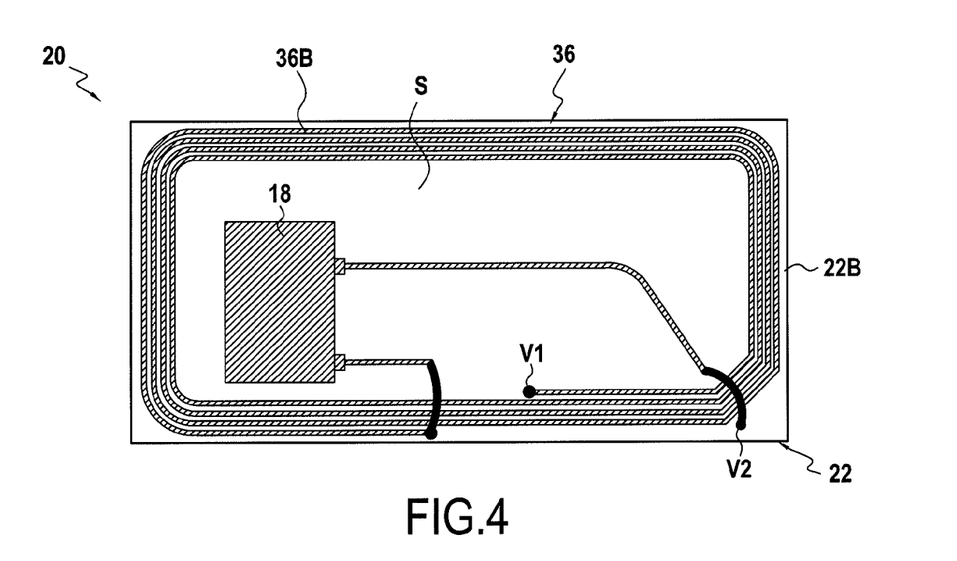

In the embodiment of the invention, as illustrated by FIGS. 3 and 4, the antenna 36 extends in two parts 36A, 36B and along the periphery of the two opposite faces 22A, 22B of the substrate 22 of the module 20, the two parts 36A, 36B being electrically interconnected by at least one via V1, V2 passing through the substrate 22 of the module 20.

For example, the part 36A of the antenna extends over the face 22A opposite face 22B bearing the microcircuit 18 and surrounds the interface 34. The substrate 22 of the module 20 has for example a rectangular general shape and the antenna 36 runs along the periphery of the substrate 22. As a variation, the substrate 22 can have any oblong shape. Preferably, the substrate 22 has dimensions compatible with known manufacturing processes used for manufacturing chip cards, whether in length, in width or in thickness.

In this embodiment the antenna 36 consists of a winding of electrically conductive coils extending along the periphery of one of the faces 22A, 22B of the substrate 22 of the module 20.

Preferably, the distance separating the antenna 36 from an outside perimeter of the face 22A, 22B of the substrate 22 is less than or equal to a coil interval, that is the minimum spacing distance between two coils of the antenna 36.

In conformity with the invention, the body 12 also incorporates means 40 for amplifying the gain of the antenna 36, comprising an electrically conductive element 42 electrically insulated from the microcircuit 18 and the antenna 36. The skilled person understands that the function of the element 42 is to concentrate or to direct the field lines from the reader toward the antenna 36.

This element 42 has, in conformity with the invention and as illustrated in FIGS. 1 and 2, an annular general shape and is arranged so as to surround a region R of the body 12 constituting a volume generated by the projection of the antenna surface along a direction substantially orthogonal to the antenna surface S. Preferably, the volume is also limited by the perimeter of the body 12. In the example described, the surface S extends parallel to the two opposite faces 22A, 22B of the substrate 22 and the orthogonal direction Z corresponds substantially to the vertical direction of the substrate 22 and therefore of the body 12 of the card 10.

In the example described, the element 42 forms a closed ring. The ring thus constitutes means of channeling the magnetic flux generated by the external terminal within the antenna 26 in order to increase the gain of the antenna. As a variation and as illustrated in FIGS. 11 to 15, the element 42 can form a ring that is broken at least once. Indeed, it has been discovered that making an open ring further improved the performance of the antenna 36.

In the example described, the ring is shaped so that the device 10 operates at a communication frequency with an external terminal for example of 13.56 MHz. Thus, the presence of the ring is taken into account in adjusting the resonance frequency of the device.

As the antenna 36 lies along the outside perimeter of the substrate 22 of the module 16, the antenna surface S corresponds substantially to the surface of the substrate 22 and the region R consequently has a transverse section corresponding substantially to the surface of the substrate 22. The ring 42 has preferably a shape generally surrounding the substrate, and therefore substantially rectangular.

The element 42 is preferably made of a metallic material with a relative magnetic permeability less than or equal to one. For example, the element 42 is made of a material such as an electrically conductive ink. In the example described, the ink includes a binder with an essentially polymeric base and metal pigments (silver for example). This ink is intended to be applied preferably by silkscreen to form a film with a thickness substantially comprised between ten and twenty micrometers.

In order to optimize the performance of the antenna 36, the element 42 extends preferably as close as possible to the antenna along a direction substantially transverse to the body 12 which corresponds to a horizontal direction of the body 12. This improvement of performance as a function of the transverse distance between the antenna 36 and the element 42 is brought out by the curve C2 of the graphic in FIG. 10.

Figure 10:
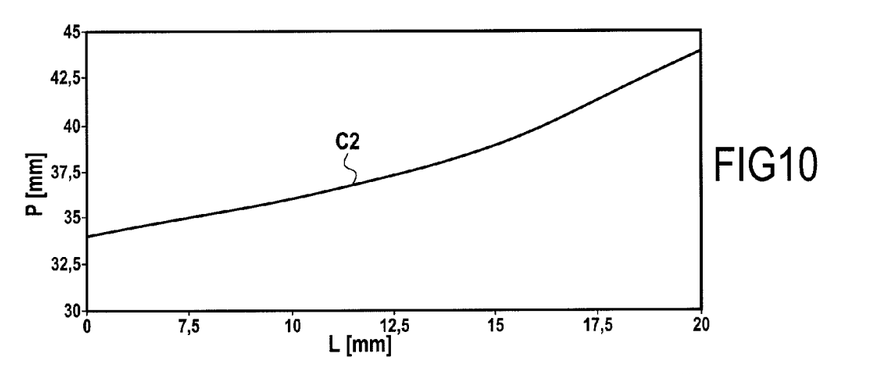
FIG. 10 is a graphic comprising a curve showing the change in the range of the electronic device of FIG. 1 as a function of the width of an annular element for amplifying the gain of an antenna of the device.
Figure 11:
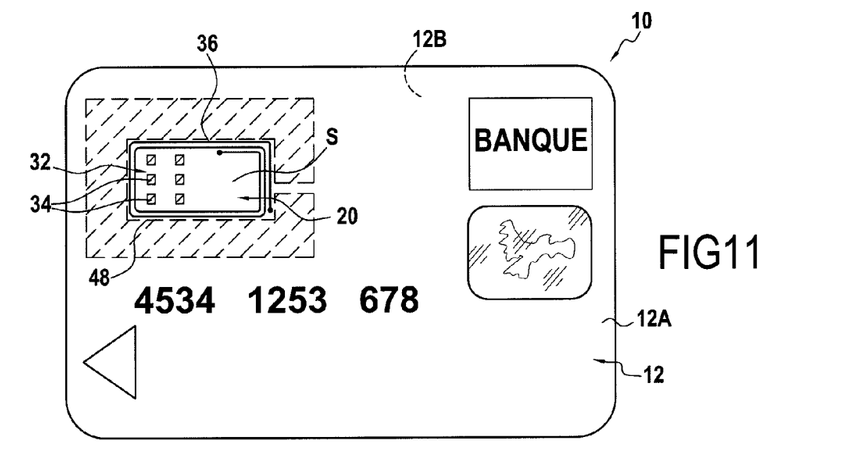
FIG. 11 shows a second variation of the device of FIGS. 1 and 2.

It is seen in this curve C2 that the more the distance D is reduced, the better is the range P, that is the reading distance expressed in millimeters.

Preferably, the element 42 delimits an inner peripheral edge 48 surrounding the region R with a minimized distance, for example less than or equal to five millimeters. For example, this distance is minimized to the limit of the positioning accuracy of the antenna 36 within the module 16.

In this example, the positioning tolerance of the antenna 36 within the module 16 corresponds to the positioning tolerance of the antenna 36 on the substrate 22.

In the example described, the antenna 36, consisting of a winding of electrically conductive coils, and the element 42 extending within the same plane as that containing the antenna 36 or at least a part 36A, 36B of the antenna 36, the minimized distance is selected to ensure electrical isolation of the antenna 26 and the element 42.

For example, in this case, the minimized distance is greater than or equal to one coil interval.

Preferably, the element 42 delimits an inner peripheral edge 48 surrounding the module 20, the inner edge 48 is at least partly flush with the surface of a peripheral wall of the cavity 24.

This makes it possible to limit the distance, along a direction transverse to the body 12, between the antenna 36 and the ring 42, to the distance separating the outer perimeter of the antenna 36 from the edge of the substrate 22 of the module 20 in the case where the dimensions of the substrate 22 are substantially fitted to those of the cavity 24.

Thus, when the substrate 22 is substantially in contact with the peripheral wall of the cavity 24, that is when the dimensions of the substrate 22 are substantially fitted to the dimensions of the cavity 24, the ring 42 surrounds the region R at a distance corresponding to the distance between the edge of the substrate 22 and the outer perimeter of the antenna 36.

The element 42 extends, in this example, substantially in a plane of the device that includes the antenna 36 or a plane including at least one of the parts 36A, 36B of the antenna 36 when the latter is in two parts.

However, in the illustrated variation, the element 42 can extend in a plane substantially parallel to that or those containing the antenna 36, for example to satisfy volume constraints specific to the device 10. Thus, in FIG. 8, different possible positions of the element 42 in the body 12 are shown, the element 42 being able in particular to be in a position visible from the outside of the device, for example by being printed on a face that is visible through the outside layer 16A or 15B, of a data printing layer 14. To vary the position of the element 42 within the body 12, for example, the thickness of the layers is varied, for example that of the sublayers of the central layer 14.

In this example, the element 42 surrounds the lateral area 30 of the cavity 24 wherein the substrate 22 extends.

Figure 9:
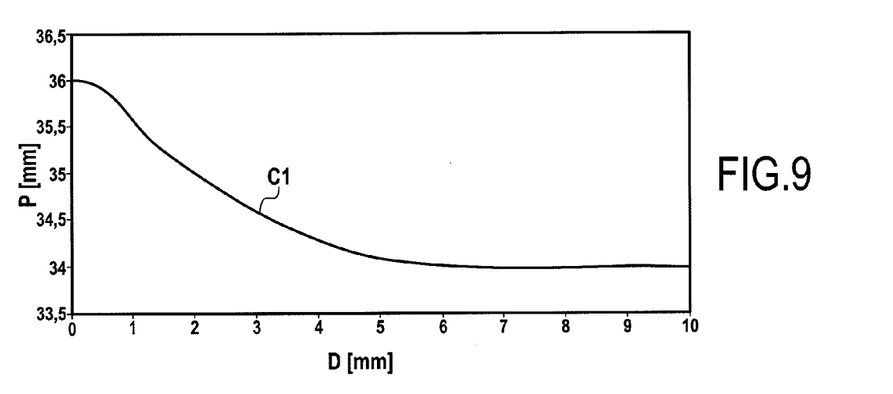
FIG. 9 is a graphic comprising a curve showing the change in the range of the device of FIG. 1 as a function of the distance separating the antenna from the element of the device.

In addition, increasing the width L of the annular element 42 also makes it possible to improve the performance of the antenna 36 and in particular the range P (see FIG. 9). FIG. 9 shows a graphic comprising a curve C1 of the change in the range P expressed in millimeters as a function of the width L of the element 42.

In this embodiment, the element 42 has a full pattern. In the variation presented on FIGS. 12 to 15, the element 42 can also have a non-full pattern. For example, the ring 42 forms a grid or even a series of concentric rings with increasing circumference, etc.

This variation presents the interest of reducing the quantity of conductive ink while keeping RF performances equivalent to that of a full pattern. This variation also presents the advantage of improving the connection between the layers, a grid pattern allowing increasing the facing plastic surface.

Figure 12:
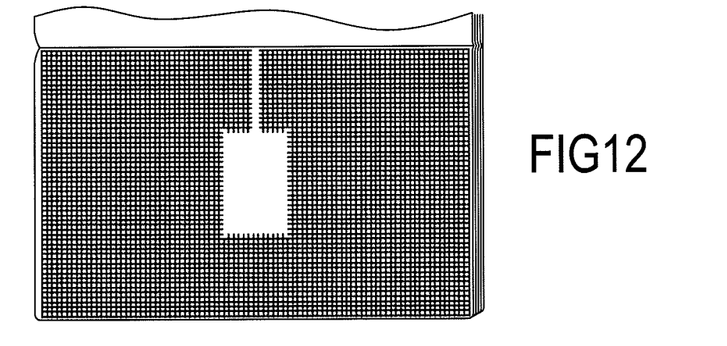
FIGS. 12 to 15 represent elements that can be used in the invention.
Figure 13:
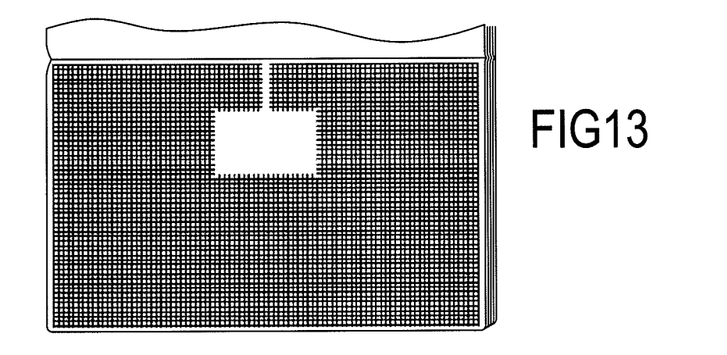

On FIGS. 12 and 13, the element 42 is designed to be used in a passport. It presents a dimension equivalent to that of a passport and a rectangular main opening of 27.2 mm×17.8 mm dimension compatible with the dimension of a module for passport. The position of the opening on FIG. 12 allows obtaining optimal contactless RF performances. The position of this opening on FIG. 13 allows, by moving the antenna closer to the seam of the passport, reducing the mechanical constrains supported by the antenna during the homologation tests and during use of the passport.

Figure 14:
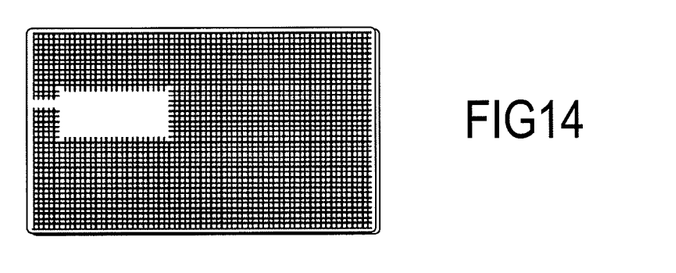
Figure 15:
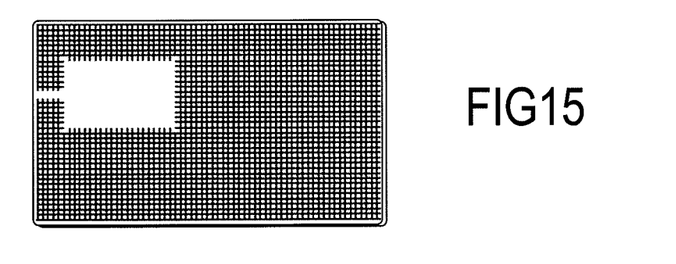

On FIGS. 14 and 15, the element 42 is designed to be used in ID1 format card. It presents a dimension equivalent to that of an ID1 card and a rectangular main opening of 27.2 mm×17.8 mm or 27.2 mm×13.1 mm dimension compatible with the dimension of a module of an ID1 format card. The skill person will understand that the larger dimension improves the contactless RF performances.

A manufacturing method for the device of FIGS. 1 through 4 will now be described with reference to FIG. 5.

Firstly, the method comprises for example a step for forming the substrate 22 of the device 10. This forming step can constitute either a step of laminating a plurality of layers together, or an operation of casting the body in plastic.

During this step of forming the body 12, an electrically conductive layer is arranged within the body 12. This arrangement is designed in such a way that, during the step of forming the cavity 24, the cavity 24 passes through the electrically conductive layer to form the ring 42. Preferably, during the forming step, the body 12 is made up of a multilayer structure, and the electrically conductive layer is interleaved between two layers of the body 12.

For example, the electrically conductive layer is printed on one of the layers of the body 12 with electrically conductive ink, for example by silk-screening or by etching.

Preferably, the electrically conductive layer is printed on a data printing layer 14. This data printing layer 14 is delimited by a face visible from the outside of the device bearing data such as the name of a bank or the identification number of a card or any personal or informational data held by the card, and an opposite, hidden face hidden in the body 12, and the electrically conductive layer is carried on this hidden face, for esthetic reasons for example.

Figure 6:
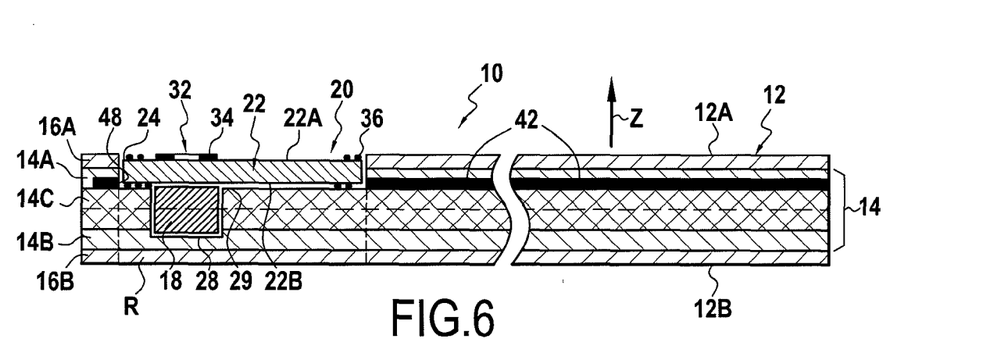
FIG. 6 shows an electronic device according to a second embodiment of the invention.

An electronic device according to a second embodiment of the invention is shown in FIGS. 6 and 7. In these figures, the elements corresponding to those in FIGS. 1 through 5 have identical reference numbers.

In this second embodiment, the layer extends transversely over the entire surface of the body as illustrated in FIG. 7. This embodiment makes it possible to obtain an element 42 with the greatest possible width L and therefore to further improve performance.

Due to the fact that the cavity 24 is formed after deposition of the electrically conductive layer, the element 42 obtained extends as closely as possible to the peripheral wall of the cavity 24 and therefore to the antenna 36 along a direction transverse to the body 12. It is then possible to obtain a precise fit of the position of the ring 42 with respect to the antenna 36. Indeed, the antenna 36 extends along the periphery of the substrate 22 of the module 20 for example with a positioning tolerance less than or equal to one coil interval.

The element 42 extends around, the cavity 24 at a substantially zero distance as the ring 42 is flush with the wall of the cavity 24. Thus, in the case where the dimensions of the substrate 22 of the module 20 are substantially fitted to the dimensions of the cavity 24, the distance along a direction transverse to the body 12 separating the element 42 and the antenna 36 can be less than or equal to the positioning tolerance of the antenna 36 on the substrate 42, and thus less than or equal to one coil interval.

In addition, the device obtained is more resistant to folding due to the combining of sensitive components such as the antenna and the microcircuit in the module.

The invention has been described more particularly for a card of the ID-1 format. It can apply to any pocket-sized, portable or other electronic device using a near-field field communication antenna the gain whereof it is desired to increase. For example, the device constitutes an inlay having a thickness comprised for example between 300 and 400 micrometers.

It is well understood that the embodiments that have just been described are not of a limiting nature and that they can undergo any desirable modification without thereby departing from the scope of the invention.

The invention claimed is:

1. An electronic device comprising a microcircuit associated with a module, a near-field communication antenna electrically connected to the microcircuit associated with the module, the antenna delimiting an antenna surface, and a body incorporating the module, wherein the antenna is arranged on a substrate of the module and wherein the body incorporates an amplifier adapted to amplify the gain of the antenna, the amplifier comprising an electrically conductive element electrically insulated from the microcircuit and from the antenna, of generally annular shape arranged around an area of the body forming a volume generated by a projection of the antenna surface along a direction substantially orthogonal to the antenna surface, wherein the body is provided with a cavity receiving the module and the electrically conductive element is a layer through which the cavity passes.

2. The electronic device according to claim 1, wherein the electrically conductive element delimits an inner peripheral edge surrounding the area at a minimized distance, less than or equal to five millimeters.

3. The electronic device according to claim 2, wherein the electrically conductive element extends within the same plane as the antenna or at least a part of the antenna and the minimized distance is configured so as to ensure electrical isolation of the antenna and the electrically conductive element.

4. The electronic device according to claim 3, wherein the antenna comprises a winding of electrically conductive coils, and the minimized distance is greater than one coil interval.

5. The electronic device according to claim 1, wherein the electrically conductive element extends within a plane parallel to a plane containing the antenna or at least a part of the antenna.

6. The electronic device according to claim 5, wherein the antenna extends along the periphery of at least one of a plurality of faces of the substrate or of two opposite faces of the substrate of the module.

7. The electronic device according to claim 1, wherein the electrically conductive element extends within a plane containing the antenna or at least a part of the antenna.

8. The electronic device according to claim 1, wherein the electrically conductive element delimits an inner peripheral edge surrounding the module which is at least partially flush with a surface of a peripheral wall of the cavity.

9. The electronic device according to claim 8, wherein the cavity has a deep central area for receiving the microcircuit and a peripheral area, raised with respect to the central area, supporting the substrate of the module, and the electrically conductive element surrounds the peripheral area.

10. The electronic device according to claim 1, wherein the electrically conductive element forms a closed ring or a ring that is broken at least once.

11. The electronic device according to claim 1, the electronic device being a chip card of the contactless type, or of the dual type, or an inlay.

12. The electronic device according to claim 1, wherein the electrically conductive element is made of a metallic material with a relative magnetic permeability less than or equal to one.

13. The electronic device according to claim 12, wherein the metallic material is an electrically conductive ink.

14. The electronic device according to claim 1, wherein the electrically conductive element has a full pattern.

15. The electronic device according to claim 14, wherein the electrically conductive element forms a grid or includes a set of concentric rings.

16. The electronic device according to claim 15, wherein the electrically conductive element is:
- a grid of the size of the page of a passport having a rectangular main opening of 27.2 mm×17.8 mm dimension; or
- a grid of the size of an ID1 format card having a rectangular main opening of 27.2 mm×17.8 mm or 27.2 mm×13.1 mm dimension.

17. A manufacturing method for an electronic device comprising a step of forming a body of the device and a step of forming a cavity in the body, wherein during the step of forming the body, an electrically conductive layer is arranged in the body such that, during the step of forming the cavity, the cavity passes through the electrically conductive layer to form an electrically conductive element incorporated in the body and of generally annular shape, and a step of incorporating a microcircuit associated with a module in the body, on a substrate of which a near-field communication antenna electrically connected to the microcircuit associated with the module is arranged, the antenna delimiting an antenna surface, the electrically conductive element adapted to amplify the gain of the antenna and being arranged around an area of the body forming a volume generated by a projection of the antenna surface along a direction substantially orthogonal to the surface.

18. The manufacturing method according to claim 17, wherein the electrically conductive layer extends transversely over the entire surface of the body.

19. The manufacturing method according to claim 17, wherein the body has a multilayer structure, the electrically conductive layer being interleaved between two layers of the body.

20. The manufacturing method according to claim 17, wherein the electrically conductive layer is printed onto one of the layers of the body with electrically conductive ink, by silk-screening onto one of the layers of the body.

21. An electronic device comprising a microcircuit associated with a module, a near-field communication antenna electrically connected to the microcircuit associated with the module, the antenna delimiting an antenna surface, and a body incorporating the module, wherein the antenna is arranged on a substrate of the module and wherein the body incorporates an amplifier adapted to amplify the gain of the antenna, the amplifier comprising an electrically conductive element electrically insulated from the microcircuit and from the antenna, of generally annular shape arranged around an area of the body forming a volume generated by a projection of the antenna surface along a direction substantially orthogonal to the antenna surface, wherein the electrically conductive element forms a ring that is broken at least once.

* * * * *